(12) United States Patent
Braunstorfinger

(10) Patent No.: US 11,615,259 B2
(45) Date of Patent: Mar. 28, 2023

(54) METHOD AND SYSTEM FOR PROVIDING A WAVEFORM DATASET AND SIGNAL GENERATION DEVICE

(71) Applicant: ROHDE & SCHWARZ GMBH & CO. KG, Munich (DE)

(72) Inventor: Thomas Braunstorfinger, Munich (DE)

( * ) Notice: Subject to any disclaimer, the term of this patent is extended or adjusted under 35 U.S.C. 154(b) by 140 days.

(21) Appl. No.: 17/354,088

(22) Filed: Jun. 22, 2021

(65) Prior Publication Data

US 2021/0406511 A1 Dec. 30, 2021

(30) Foreign Application Priority Data

Jun. 26, 2020 (EP) .................................... 20182532

(51) Int. Cl.
*G06F 1/02* (2006.01)
*G06K 9/00* (2022.01)
*G06F 21/31* (2013.01)
*G06F 21/60* (2013.01)
*G06F 21/62* (2013.01)
*G06F 21/64* (2013.01)
*G06F 21/73* (2013.01)

(52) U.S. Cl.
CPC ........... *G06K 9/0053* (2013.01); *G06F 1/022* (2013.01); *G06F 21/31* (2013.01); *G06F 21/602* (2013.01); *G06F 21/6227* (2013.01); *G06F 21/64* (2013.01); *G06F 21/73* (2013.01)

(58) Field of Classification Search
CPC ....................................................... G06F 1/022
See application file for complete search history.

(56) References Cited

U.S. PATENT DOCUMENTS

| 7,340,605 | B2 | 3/2008 | Caminschi | |
| 11,464,559 | B2* | 10/2022 | Nott | ................... A61B 18/1206 |
| 2006/0200512 | A1 | 9/2006 | Kumaki et al. | |
| 2013/0246073 | A1* | 9/2013 | Sakata | ................... G10L 19/04 |
| | | | | 704/500 |

FOREIGN PATENT DOCUMENTS

EP 1717711 B1 4/2015

OTHER PUBLICATIONS

Extended European Search Report, European Application No. 20 182 532.0, dated Dec. 3, 2020, 5 pgs.
Heyman JM et al., "Variable Expiration Dates on a Specific Executable", IP.com, IP.com Inc., West Henrietta, NY, US, Apr. 1, 1994 (Apr. 1, 1994), XP013100158, ISSN: 1533-0001.

* cited by examiner

*Primary Examiner* — Cassandra F Cox
(74) *Attorney, Agent, or Firm* — Carlson, Caspers, Vandenburgh & Lindquist, P.A.

(57) ABSTRACT

The present invention relates to a generation of a signal by executing a waveform dataset comprising waveform descriptive parameters. The execution of the waveform description parameters is limited by target device information specifying one or more specific target devices and time information specifying an execution period of the waveform descriptive parameters. By providing a waveform dataset comprising not only the waveform descriptive parameters, but also further information, in particular time information for limiting the execution period of the waveform descriptive parameters, the generation of the respective waveform signal is controlled.

15 Claims, 2 Drawing Sheets

METHOD AND SYSTEM FOR PROVIDING A WAVEFORM DATASET AND SIGNAL GENERATION DEVICE

TECHNICAL FIELD

The present invention relates to a method for providing a waveform dataset, in particular a waveform dataset for executing a waveform generation on a signal generation device. The method further relates to a system for providing a waveform dataset and a signal generation device.

TECHNICAL BACKGROUND

Although applicable in principle to any kind of user specific waveform generation, the present invention and its underlying problem will be hereinafter described in connection with a signal generator for generating test signals according to predefined signal waveform.

During development and testing of modern devices, in particular radio frequency devices such as modern communication devices, appropriate test signals are required. For this purpose, test devices such as signal generators may be used which may provide one or more test signals with specific characteristics such as predefined signal waveform. Depending on a test scenario, complex signal waveform may be required. For example, a specific parameterization and/or description of a signal waveform may be provided and this parameterization or description may serve as a basis for generating the desired signal waveform by the signal generator.

Depending on the complexity of the signal waveform, the generation of the required parameterization and description may be a very complex task. Thus, a user may have to pay for this service. However, a user would like to have the possibility to test the provided data before paying a huge amount of money. Furthermore, it would be desirable to charge a use-dependent amount. It is therefore desirable to provide a method and a system which allows an improved control for a generation of signal waveform based on predefined datasets. In particular, the present invention aims to provide a solution for providing waveform related datasets which allows an improved control of the use of such a dataset.

SUMMARY OF THE INVENTION

The present invention provides a method and a system for providing a waveform dataset for executing waveform generation and a signal generator with the features of the independent claims. Further advantageous embodiments are subject matter of the dependent claims.

According to a first aspect, a method for providing a waveform dataset for executing waveform generation on a signal generation device is provided. The method comprises a step of generating at least one first data section comprising waveform descriptive parameters. In a further step at least one second data section is generated. The second data section may comprise target device information relating to a target device which executes the waveform generation. In a further step at least one third data section is generated. The third data section comprises time information. The time information may relate to an execution period of the waveform dataset. Finally, the method comprises a step for providing a waveform dataset. The provided waveform dataset includes the at least one first data section, the at least one second data section and the at least on third data section. Therefore the first data sections, the second data sections and the third date sections may be combined to a common waveform dataset.

According to a further aspect, a system for providing a waveform dataset for executing waveform generation on a signal generation device is provided. The system comprises a data generator, a waveform memory and a transmission device. The waveform generator is configured to generate at least one first data section, at least one second data section and at least one third data section. The at least one first data section comprises waveform descriptive parameters. The at least one second data section comprises target device information of a target device for executing the waveform generation. The at least one third data section comprises time information relating to an execution period of the waveform dataset. The data generator is further configured to create a waveform dataset. The waveform dataset includes the at least one first data section, the at least one second data section and the at least on third data section. The waveform memory is configured to store the waveform dataset. The transmission device is configured to provide the waveform dataset to a signal generation device.

According to a third aspect, a signal generation device for generating a signal having a predetermined waveform is provided. The signal generation device comprises a receiving unit and a signal processor. The receiving unit is configured to receive a waveform dataset. The waveform dataset includes at least one first data section, at least one second data section and at least one third data section. The at least one first data section comprises waveform descriptive parameters. The at least one second data section comprises target device information of at least one target device for executing the waveform generation. The at least one third data section comprises time information relating to an execution period of the waveform dataset. The signal processor is configured to generate an output signal based on the waveform descriptive parameters of the received waveform dataset. In particular, the signal processor may perform the generation of the output signal if the time information in the respective dataset meets a predetermined condition according to the related time information, otherwise the signal generation may be disabled.

The present invention takes into account that the generation of signal waveform based on descriptive parameters may require complex datasets for describing the desired signal waveform. In this connection, there is a need for flexible and a versatile control for the use of such waveform datasets for defining a generation of signal waveform. For example, by limiting the use of waveform datasets, it may be possible for a user to test the dataset before paying a huge amount of money. Furthermore, by limiting the period of use for a specific waveform dataset, it may be possible to establish appropriate payment models for charging, for example paying only a small amount for a temporal limited use of the waveform dataset.

The present invention is based on this finding and aims to provide a method and a system for providing a waveform dataset which can be used for executing a waveform generation on a signal generation device such that the use of the dataset can be controlled very precisely in a flexible and versatile manner.

Accordingly, the present invention proposes to establish a waveform dataset, for example a data container or a file format, which comprises not only the pure parameterization of a signal waveform, but also further specifications. For example, time information for limiting the execution period of the waveform dataset may be added the waveform dataset. This time information my specify, for example, an expiration data and/or time for specifying a point in time until when the waveform dataset may be used. However, any other kind of time information may be possible, too. For example, it may be also possible to specify a period of time which specifies how long the waveform dataset may be executed. In such a case, the execution periods of time may be accumulated. Upon the maximum execution period is achieved, a further waveform generation based on the waveform dataset may be prevented. Furthermore, it may be also possible to specify a starting point in time for executing the waveform dataset or any other time related limitation for executing the waveform dataset.

Furthermore, the waveform dataset may comprise information for specifying one or more target devices. The target devices specified in the waveform dataset may be specific devices which are configured to or allowed to execute the waveform dataset. In this way, the execution of the waveform dataset can be limited to a number of one or more predetermined signal generating devices. Furthermore, it may be also possible to specify a predetermined type of signal generating device. In this way, it is possible to prevent an execution of the waveform dataset by an inappropriate signal generating device. Accordingly, malfunction or even damage of an inappropriate signal generating device can be prevented.

The waveform descriptive parameter in the waveform dataset may be any kind of data which are appropriate for generating a desired signal waveform by a related signal generating device. For example, the descriptive parameter may be similar to descriptive signal generation parameters of a conventional data format. However, any appropriate known or future format for specifying a generation of a desired signal waveform by a signal generating device may be possible. For example, the descriptive parameters may specify series of values, for example voltage levels, which specify a signal waveform. However, any other appropriate manner for describing and parameterization of a signal waveform may be also possible.

In case that the waveform dataset may specify a number of two or more signals in a common dataset, it may be possible to specify the individual signals in separate sections of the dataset. However, it may be also possible to combine two or more signals in a common data section. Furthermore, it may be possible to provide a related section for specifying the target device and/or time information for each of the signals specified in the descriptive section of the waveform dataset.

The determination or computation of the required data for the waveform dataset may be performed by an appropriate computing device, For example, desired requirements or specifications for a specific signal waveform may be provided. Based on the specifications, an appropriate parameterization and configuration of a signal generating device may be, computed. The computed data may be stored in any appropriate storage device. For example, the storage of the parameter of desired signal waveform, i.e. the descriptive parameters of the signal waveform, may be stored in a storage device of a cloud service. Furthermore, it may also possible to perform the computation of the required descriptive parameters for a desired signal waveform by a computing arrangement of a cloud service. However, it is understood, that any other appropriate device for determining the descriptive parameters of a signal waveform and storing the generated parameterization of the waveform may be possible, too. The use of the generated descriptive parameters of a signal waveform may be limited to a number of one or more specific target devices or one or more groups of target devices. For this purpose, the respective target devices may be specified by appropriate information in one or more further sections of the waveform dataset. In this way, it can be ensured that the respective waveform dataset, in particular the descriptive parameters of the waveform dataset, are only executed by an appropriate target device. Thus, malfunctions or even damages of inappropriate target devices can be avoided. Furthermore, it may be also possible to limit the use of a specific waveform dataset to one or more signal generating devices related to a specific user or group of users. Accordingly, copyright restrictions or any other constraints may be taken into account.

Additionally, temporal limitations for a use of the waveform dataset may be specified by a further data section of the waveform dataset which relates to time information. Accordingly, the time information provided in such a data section may limit the execution of the waveform dataset to a specific period of time. For example, the execution of a dataset may be limited to a predetermined date or point in time. Accordingly, no further use of the waveform dataset after the specified point in time may be possible. However, any other appropriate temporal limitations may be possible, too. For example, it may be also possible to define a starting point in time. Accordingly, the waveform dataset may be not used before this starting point in time. Furthermore, a maximum period of time may be specified. In such a case, the use of the waveform dataset may be limited to a specific period of time. In particular, the measurement of the allowed period of time may start upon first execution of the waveform dataset. Furthermore, the period of time may be also a period of time which relates to an accumulated execution time of the waveform dataset. In this way, interruptions in the execution may be not charged to the allowable period of time for executing the waveform dataset. However, any other kind of temporal specification or limitation for the waveform dataset in the respective data section of the waveform dataset may be also possible.

Accordingly, the waveform dataset may be generated by compiling the data section specifying the waveform descriptive parameters, the data section comprising the target device information and the dataset comprising the time information.

By generating and providing such a compact waveform dataset comprising not only the descriptive parameters but also further specification relating to the target devices and the temporal limitation for executing the waveform dataset, a flexible and versatile characterization for generating signal waveform can be achieved. For example, it is possible to implement a user-friendly and fair charging model for testing a waveform dataset or for a limited use of a waveform dataset. However, the use of the specific waveform dataset according to the present invention may also provide further advantages. For example, by limiting the temporal use of the waveform dataset, it is also possible to prevent a use of old and invalid waveform datasets. For example, the temporal limitations of the waveform dataset may be also used to establish a control system for multiple releases. For example, by limiting the temporal use of a waveform dataset, it can be ensured that only new and actual releases are used, and older versions of the waveform dataset cannot be further executed.

The waveform datasets according to the present invention may be provided to a signal generating device such as a signal generator or the like. For this purpose, any appropriate signal generator may be used. The signal generating device may comprise, for example, a processing unit for receiving and analyzing the provided waveform datasets in particular, the processing device may extract the target device information and the time information, and verify whether or not the respective target device information and time information are still valid. Only if the respective information are valid, the execution of the waveform dataset is allowed. Otherwise, the execution of the waveform dataset is prevented. For example, the execution of the waveform dataset may be performed by a signal processor or the like. For this purpose, the signal processor may comprise a processing unit such as a microprocessor or the like with a related memory, in particular a memory for storing the descriptive parameters of the waveform dataset. Furthermore, the signal processor may comprise any kind of additional elements such as digital to analog converters, amplifiers, attenuators, filters, resistors, capacitors or the like.

Further embodiments of the present invention are subject of the further subclaims and of the following description, referring to the drawings.

In a possible embodiment, the waveform descriptive parameters of the at least one first data section include digital in-phase data and digital quadrature data. In this way, the desired signal waveform can be specified very precisely. For example, a time series of samples for in-phase and quadrature components may be provided.

In a possible embodiment, the waveform descriptive parameters of the at least one first data section include a parameter set for configuring the target device. For example, the parameter set for configuring the dataset may comprise all relevant parameters for setting up the target device in an operating mode which is appropriate for executing the waveform dataset. For example, the parameter set may comprise parameters such as temporal resolution, output level, frequency range, filter characteristics, modulation etc. However, any other kind of configuration of the target device may be possible, too.

In a possible embodiment, the target device information in the at least one second data section comprises a serial number of the target device. Additionally or alternatively, the second data section may comprise a device identifier, in particular any kind of unique device identifier of one or more target devices. Furthermore, the second data section may comprise any other kind of specification for a target device. For example, a specific group of target devices, e.g. a specific type of target devices or target devices relating to a specific manufacturer or the like may be specified in the target device information. By characterizing the target device in the target device information, it can be ensured that only target devices which are appropriate for executing the provided waveform dataset may execute the waveform dataset. Thus, unexpected effects, malfunction of a signal generating device or the like can be avoided.

In a possible embodiment, the time information in the at least one third data section comprises a period of validity. Additionally or alternatively, the time information may comprise a time of expiration. However, it is understood, that any other kind of temporal specification, in particular any kind of temporal limitation may be specified by the time information of the third data section. For example, The execution time of the waveform dataset may be limited to a specific period of time. By limiting the execution of The waveform dataset in a temporal manner, an appropriate charging model may be established such that a waveform dataset may be used before paying for the respective dataset. Furthermore, it may be possible to charge a small amount of money for a temporal limited execution of the waveform dataset. However, it may be also possible to consider any other aspects such as limiting the temporal execution of the waveform dataset to avoid an execution of older waveform datasets. Thus, it can be ensured that only newer versions of a waveform dataset may be used and the execution of older versions may be prevented based on the temporal limitations.

In a possible embodiment, the waveform dataset is encrypted at least in part. For this purpose, any appropriate encryption scheme may be applied. For example, at least the descriptive parameters of the waveform dataset may be encrypted. Accordingly, an unauthorized execution of the waveform dataset can be prevented. However, it may be also possible to encrypt further sections of the waveform dataset. In this way, manipulation of the waveform dataset can be prevented. For example, same encryption may be applied to all data sections of the waveform dataset. However, it may be also possible to apply individual, especially different encryption schemes to the individual data sections of the waveform dataset. For example, separate encrypt on keys may be used for the individual data sections. By applying different encryptions to individual sections of the waveform dataset, it may be possible to specify individual limitations to each of the respective data sections.

In a possible embodiment, the waveform dataset may comprise a decryption functionality. Accordingly, the respective functionality for decrypting encrypted parts of the waveform dataset may be performed based on a decryption functionality provided in the waveform dataset. In particular, the decryption functionality of the waveform dataset may be activated based on predetermined authentication credentials. Such authentication credentials may be, for example, a password, a personal identification number (PIN) or the like. Furthermore, more complex authentication credentials, for example biometric authentication credentials, a smart card, an RFID chip or the like may be also possible. However, it is understood that any other kind of authentication credentials may be also possible.

In a possible embodiment, the method for providing the waveform dataset may further comprise a step of generating a metadata section. The metadata section may include at least one of the following: information of a creator of the waveform, a user of the waveform dataset, a use case or application which is applicable for the waveform, a date and/or time information, in particular a creation date and/or an expiration date. However, the metadata section may comprise any other kind of appropriate information in connection with the waveform data set. The metadata may be provided in a human readable text form.

In a possible embodiment/the method comprises a step of including a digital signature to the waveform dataset. By including a digital signature to the waveform dataset, an authenticity of the provided waveform dataset can be verified.

In a possible embodiment of the system for providing the waveform dataset, the system may further comprise a user interface. The user interface may be configured to receive specifications of a desired signal waveform. The specifications may be provided in any appropriate form. For example, a user may upload a file for characterizing the desired specifications. However, it may be also possible that a user may manually enter desired specifications by an input terminal. Accordingly, the data generator of the system may be configured to generate at least the descriptive parameters based on the received specifications.

In a possible embodiment of the signal generating device, the receiving unit may be configured to receive a waveform dataset which is encrypted at least in part. In this case, the system may comprise a decryption unit for decrypting the encrypted waveform dataset. For example, the key for decrypting the encrypted waveform datasets may be firmly stored in the signal generating device. However, it may also possible to provide the decryption key in any appropriate manner. For example, decryption key may be provided by a secure data (SD) card, a smart card, an RFID chip or the like. Furthermore, the key data may be also provided to the decryption unit by a secure communication link.

In a possible embodiment, the signal generation device may comprise a memory for storing the received waveform dataset. In particular, the received waveform dataset may be stored at least partially in an encrypted form. Accordingly, the decryption unit may be configured to decrypt the encrypted waveform dataset only if the related time information is valid. In this way, an unauthorized use of the waveform dataset out of the allowed time range can be prevented.

In a possible embodiment, the signal generating device comprises an authentication unit. The authentication unit may be configured to receive authentication information of a user and/or a group of users. Accordingly, the signal processor may be configured to generate the output signal only if a predetermined user or a user of a predetermined group has been authenticated based on the received authentication information. In this way, an unauthorized use of the waveform dataset can be prevented.

With the present invention it is possible to establish a signal Generation based on specific data provided by a waveform dataset. In particular, the execution of the waveform dataset for characterizing a specific signal waveform may be limited not only to predetermined target devices but also to temporal constraints. For example, a maximum execution time of the waveform dataset or an expiration date of the waveform dataset may be specified to limit the execution of the waveform dataset. In this way, flexible and versatile charging model can be established. Further to this, execution of older revisions of a waveform dataset may be prevented, such that only actual versions of a waveform dataset are used for execution.

BRIEF DESCRIPTION OF THE DRAWINGS

For a more complete understanding of the present invention and advantages thereof, reference is now made to the following description taking in conjunction with the accompanying drawings. The invention is explained in more detail below using exemplary embodiments, which are specified in the schematic figures and the drawings, in which.

Figure 1:
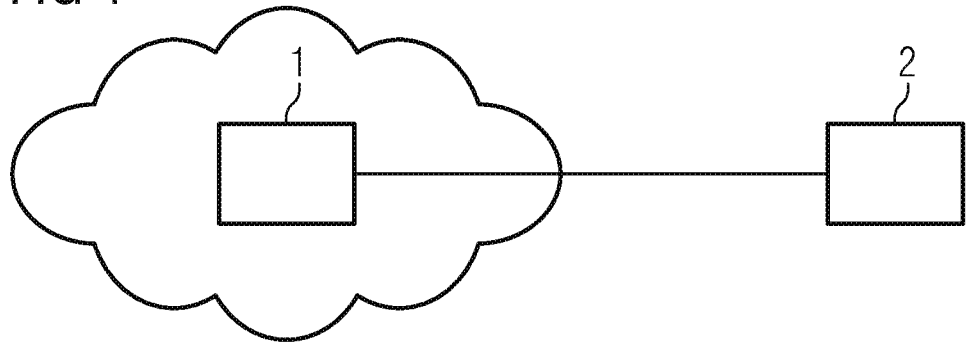
FIG. 1: shows a schematic block diagram of an arrangement for providing a waveform dataset and generating a signal according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown in scale.

In the drawings, same, functionally equivalent and identical operating elements, features and components are provided with same reference signs in each case, unless stated otherwise.

DETAILED DESCRIPTION OF EMBODIMENTS

FIG. 1 shows a schematic block diagram of an arrangement for generating a signal with a specific waveform. The arrangement comprises a system 1 for providing a waveform dataset and a signal generating device 2 for generating a signal with a predetermined waveform. In this arrangement, the system 1 may generate a waveform dataset according to predetermined specifications or requirements for a desired waveform signal. For example, it is possible to specify an envelope curve of a desired signal, a carrier frequency, a baseband signal, a specific modulation scheme, or any further properties of a desired signal waveform. Based on the specified parameters, descriptive parameters may be determined. The descriptive parameters may serve as a basis for the signal generating device 2 in order to generate a waveform signal according to the specifications provided to system 1. For example, the descriptive parameters of the waveform dataset may comprise a parameter set for configuring the signal generating device 2. The parameter set for configuring a signal generating device 2 may comprise, for example, parameters for selecting a specific frequency or frequency range, settings for a specific amplification or attenuation, modulation parameters or any other parameter which may be configured in the signal generating device 2. Furthermore, the descriptive parameters of the waveform dataset may comprise digital data of an in-phase signal and digital data of a quadrature signal. The descriptive parameters of the waveform dataset may comprise one or more series of values for specifying a signal sequence of the desired waveform signal. For example, the individual values may relate to values a specific predetermined temporal resolution. However, it is understood, that the desired signal waveform may be specified by the descriptive parameters in any other appropriate manner.

Further to the descriptive parameters for the desired signal waveform, the waveform dataset may comprise additional data with respect to the signal generating device for executing the waveform dataset and time information for specifying temporal limitations for executing the waveform dataset. The data with regard to the signal generating device for executing the waveform dataset may specify, for example, one or more types of signal generating devices which are allowed to execute the waveform dataset. However, it may be even possible to further specify the signal generating device. For example, one or more predetermined signal generating devices 2 may be specified in the information which characterize the target device. For this purpose, the respective target signal generating devices 2 may be specified, for instance, by a serial number or any other kind of identifier, for example a unique identifier of the respective target signal generating device 2.

The time information for specifying the temporal constraints with respect to the execution of the waveform dataset may specify, for example, a date or a point in time up to which it is permitted to execute the waveform dataset. Furthermore, the time information may comprise a period of time in which the waveform dataset may be executed. For example, the period in time may be specified by a starting point in time and an ending point in time. It may be also possible to specify a maximum period in time for executing the waveform dataset. In this example, it may be possible to accumulate the execution time of the signal waveform generation and to prohibit a further execution of the waveform dataset after the maximum execution time for the waveform dataset has been reached. However, any other temporal constraints for executing the waveform dataset may be possible, too.

The waveform dataset which is generated by the system 1 for generating the waveform dataset may be provided to the signal generating device 2 by any appropriate manner. For example, the waveform dataset may be provided to the device 2 for generating the signal by a wired or wireless communication link, for example an internet connection or the like. However, it may be also possible to store the generated waveform dataset on a storage medium, for example a secure data (SD) card, a USB stick, a portable disc drive or any other appropriate portable storage medium.

Figure 2:
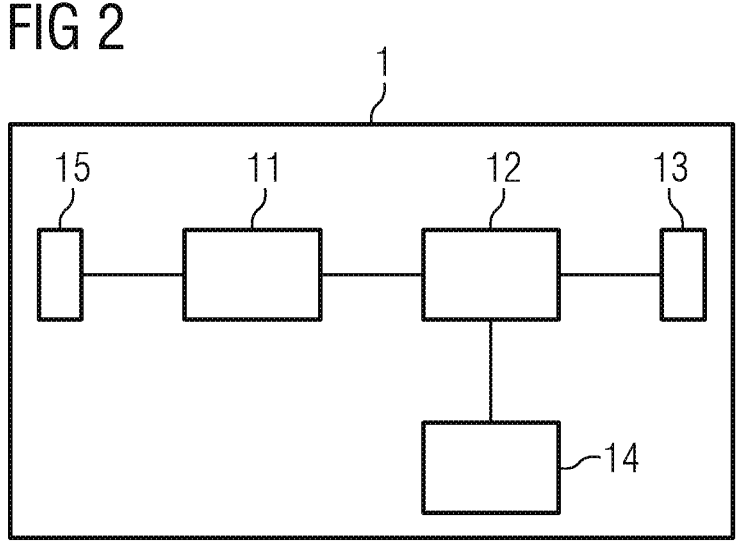
FIG. 2: shows a schematic block diagram of a system for providing a waveform dataset according to an embodiment.

FIG. 2 shows a schematic block diagram of a system 1 for providing a waveform dataset. The system 1 may comprise a data generator 11. Data generator 11 may generate the waveform descriptive parameters which may be used for generating the desired signal waveform by the signal generating device 2. Further, data generator 11 may generate target device information for specifying a type of a signal generating device 2, a specific signal generating device 2 or a group of signal generating devices 2. Accordingly, the generation of the waveform descriptive parameters may be specifically adapted for execution on the target signal generating devices 2 as specified by the target device information. Further to this, data generator 11 may generate time information for specifying a point in time until which the execution of the waveform descriptive parameters is permitted or for specifying a period in time in which the execution of the waveform descriptive parameters is permitted. As already mentioned above, the time information may relate to any other appropriate scheme for permitting or limiting the execution of the waveform descriptive parameters by a signal generating device 2.

After generating all required data, in particular the waveform descriptive parameters, the target device information and the time information, the data generator 11 may combine the waveform descriptive parameters, the target device information and the time information to a common waveform dataset.

In case that a number of two or more signal waveform shall be characterized by the waveform dataset, separate data sections may be provided for each desired signal waveform. Accordingly, an individual data section for the target device information and the time information may be provided for each data section of a specific signal waveform. However, it may also possible to assign one data section of target device information and/or time information to a number of two or more data sections for specifying descriptive parameters of signal waveform.

The time information in the waveform dataset may be determined, for example, according to a specific expiration date. The expiration date may be, for example, a date after which a new version of the waveform dataset may be issued. Accordingly, it can be ensured that older versions of a waveform dataset are no longer used after the expiration date, and thus always the latest version of the waveform dataset is used.

Alternatively, it may be also possible to establish a payment system and to set the time information, for example the expiration date/time, according to an amount which has been paid for the waveform dataset. For example, a short period of time, e.g. one day or one week may be set as a period of time for testing the provided waveform dataset. For example, such a test period may be free of charge, or only a small amount of money is charged for such a test. Furthermore, the time period for using the waveform dataset may be set to a first period of time, for example a week, a month or the like, if a first predetermined amount of money is paid. If another, higher amount of money is paid, a longer period of time for using the waveform dataset may be specified in the time information. In this way, a payment model for using the waveform dataset may be established depending on the individual needs of each user which wants to use the respective waveform dataset.

The generated waveform dataset with the descriptive waveform parameters, the target device information and the time information will be stored in a memory 12 of the system 1 for providing a waveform dataset. Furthermore, the waveform dataset may be provided to one or more signal generating devices 2. For this purpose, a communication link may be established between the system 1 for generating the waveform dataset and the signal generating device 2. In particular, a transmitter 13 of the system 1 for generating the waveform dataset may transmit the generated waveform dataset via communication link to the signal generating device 2. The communication link may be a wired or wireless communication link. For example, an internet connection may be used for transmitting the waveform dataset to the signal generating device 2. However, it may be also possible to provide the generated waveform dataset by means of a storage medium such as an SD card, USB stick, hard, disc drive or the like.

In order to improve the security of the data included in the waveform dataset and to prevent manipulation, it may be possible to encrypt the data in the waveform dataset at least in part. For this purpose, an encryption device 14 may be used. Encryption device 14 may apply an appropriate encryption to the desired data sections of the waveform dataset. For example, the waveform dataset may be encrypted completely by a single encryption key. However, it may be also possible, for example, to encrypt each data section of the waveform dataset by a separate encryption key. Especially, it may be possible to apply different encryptions to the waveform descriptive parameters, the target device information and the time information. In case that the descriptive parameters in the waveform dataset may relate to a number of two or more signal waveform, a separate encryption key may be applied to the individual signal waveforms.

Furthermore, the system 1 for providing the waveform dataset may comprise an input interface 15 for receiving input data. In particular, it may be possible to provide the requirements or constraints of the desired signal waveform which shall be specified by the descriptive parameters of the waveform dataset. The specifications may be provided directly by means of an input terminal or the like. However, it may be also possible that the requirements for the waveform descriptive parameters are provided by means of a communication link from a remote device.

Furthermore, in case that a payment system is established, in particular a payment system which considers different periods of usage for the waveform dataset, it may be also possible to provide the respective data to the system 1 via the interface 15.

The system 1 for providing the waveform dataset may be realized, for example, by a single processing device such as a computer or computer system. However, it may be also possible to realize the system 1 for providing the waveform dataset by a cloud service or the like.

Figure 3:
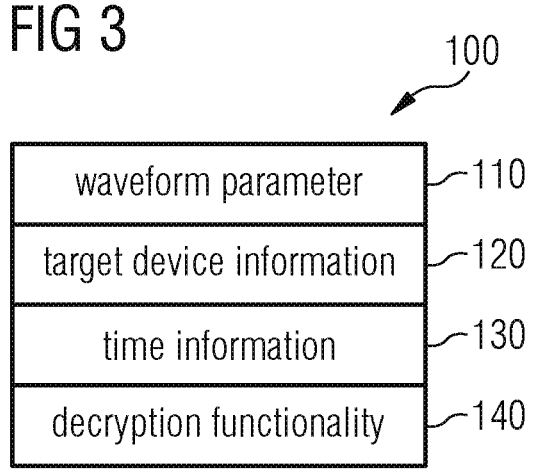
FIG. 3: shows a schematic diagram of a waveform dataset according to an embodiment.

FIG. 3 shows a schematic illustration representing a waveform dataset according to an embodiment. As already mentioned above, the waveform dataset 100 may comprise a number or one or more first data sections 110 comprising waveform descriptive parameters. In particular, it may be possible to provide multiple data sections, wherein each data section relates to waveform descriptive parameters of a separate waveform. Further, waveform dataset 100 may comprise one or more second data sections 120 for specifying the target device information, and one or more third data sections for specifying the time information as already described above.

In case that at least a part of the waveform dataset 100 is encrypted, it may be also possible to add a decryption functionality 140 to the waveform dataset 100. In such a case, it may be possible to decrypt the encrypted parts of the waveform dataset 100 based on the decryption functionality 140. For example, the decryption functionality 140 in the waveform dataset 100 may be activated by predetermined authentication credentials. For example, the authentication credentials may be a code, a password, a PIN or the like. In this way, the waveform dataset may be provided to a user in advance, and the user may decrypt and use the waveform dataset upon entering the authentication credentials. It is understood, that any kind of authentication credentials for activating the decryption functionality 140 may be possible.

Figure 4:
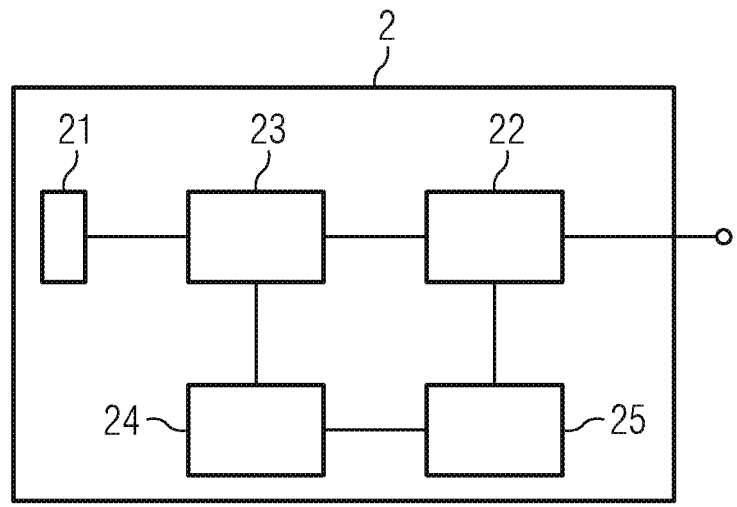
FIG. 4: shows a schematic block diagram of a signal generating device according to an embodiment.

FIG. 4, shows a schematic block diagram of a signal generating device 2 according to an embodiment. The signal generating device 2 comprises a receiving unit 21 for receiving a waveform dataset. As already mentioned above, the waveform dataset may be provided to the receiving unit by means of a wired or wireless communication link from the system 1 for providing the waveform dataset. In this case, the receiving unit may comprise an appropriate terminal for establishing a communication to the system 1. Alternatively, it may be also possible that the waveform dataset is provided by means of a storage medium. Accordingly, receiving unit 21 may comprise an interface for connecting such a storage medium to the signal generating device 2.

Receiving unit 21 may receive a waveform dataset in a form as already described in detail above. The received waveform. dataset may be provided to a signal processor 22. Accordingly, signal processor 22 may execute the waveform dataset and generate a signal based on the waveform descriptive parameters provided by the waveform dataset. However, the execution of the waveform descriptive parameters in the waveform dataset may be limited based on the target device information and the time information provided in the waveform dataset. Accordingly, signal processor 22 analyzes the target device information 120 and determines whether or not the target device information 120 matches the properties of the signal generating device 2 which has received the waveform dataset.

If the constraints with respect to the target device information 120 are fulfilled, signal processor 22 may further analyze the time information 130. For example, it may be analyzed whether or not an expiration date or time of the time information has been reached, or a maximum time period for executing the waveform dataset has been reached. However, any other temporal constraints set by the time constraints may be checked, too.

If the constraints regarding the target device information 120 and the time information 130 are fulfilled, signal processor 22 may execute the waveform descriptive parameters 110 and generate an output signal according to the waveform descriptive parameters. The output signal may be provided by an output terminal of signal generating device 2.

Signal Generating device 2 may further comprise a memory 23 for storing the waveform dataset 100 received by receiving unit 22. In case that the received waveform dataset 100 is encrypted, at least in part, the encrypted parts of the waveform dataset 100 may be decrypted by a decrypting unit 24. For this purpose, a decryption functionality 140 included in the waveform dataset 100 may be used. However, it may be also possible to apply a predetermined decryption scheme which is firmly implemented in decrypting unit 24. For example, a device specific key may be implemented in the decrypting unit 24 of the signal generating device 2. Accordingly, by applying an appropriate encryption scheme in the system 1 for providing the waveform dataset, it may be possible to limit the decryption to the desired signal generating device 2.

Further, the signal generating device 2 may comprise an authentication unit 25. Authentication unit 25 may receive authentication credentials for activating the decryption functionality 140 of the waveform dataset 100. Furthermore, authentication unit 25 may receive authentication information of a user. Accordingly, the signal generation, in particular the signal generation based on the waveform dataset may be limited to a specific user or a specific group of users. The authentication information may be any kind of information, for example biometric information, a password, a PIN, an RFID chip or the like.

Figure 5:
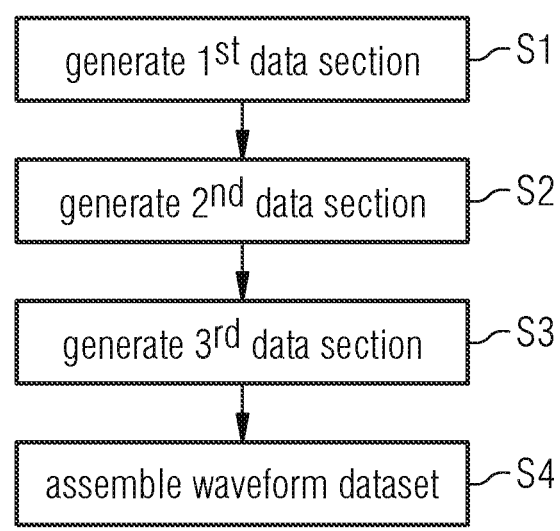
FIG. 5: shows a flow diagram of a method for providing a waveform dataset according to an embodiment.

FIG. 5 shows a schematic flow diagram of a method for providing a waveform dataset according to an embodiment. The method may comprise any kind of steps which are appropriate to implement a functionality as already described above in connection with the arrangement of the system 1 for providing a waveform dataset and the signal generating device 2. Accordingly, the above described devices may comprise any appropriate element for implementing a functionality as described below in connection with the method.

The method may provide a waveform dataset for executing waveform generation on a signal generating device 2. In a step S1, at least one first data section comprising waveform descriptive parameters are generated. In a step S2, at least one second data section comprising target device information are generated. The target device information specify a target device or target devices for executing the waveform generation. In a step S3, at least one third data section is generated, wherein the third data section comprises time information relating to an execution period of the waveform dataset. In a step S4, a waveform dataset is provided. The waveform dataset includes the at least one first data section, the at least one second data section and the at least one third data section.

The waveform descriptive parameters may include digital in-phase data and digital quadrature data. The descriptive waveform parameters may comprise a parameter set for configuring the target device, in particular the signal generating device 2.

The target device information may comprise a serial number of a target device and/or a device identifier of the target device.

The time information may comprise a period of validity and/or a time of expiration.

Summarizing, the present invention relates to a generation of a signal by executing a waveform dataset comprising waveform descriptive parameters. The execution of the waveform description parameters is limited by target device information specifying one or more specific target devices and time information specifying an execution period of the waveform descriptive parameters. By providing a waveform dataset comprising not only the waveform descriptive parameters, but also further information, in particular time information for limiting the execution period of the waveform descriptive parameters, the generation of the respective waveform signal can be controlled.

LIST OF REFERNECE SIGNS 1 system for providing waveform dataset
2 signal generating device
11 data generator
12 memory
13 transmitter
14 encryption device
15 input interface
21 receiving unit
22 signal processor
23 memory
24 decrypting unit
25 authentication unit
100 waveform dataset
110 first data section
120 second data section
130 third data section
140 decryption functionality

What I claim is:

1. A method for providing a waveform dataset for executing waveform generation on a signal generation device, the method comprising:
generating at least one first data section comprising waveform descriptive parameters,
generating at least one second data section comprising target device information relating to a number of one or more target devices for executing the waveform generation,
generating at least one third data section comprising time information specifying an execution period of the waveform dataset, and
providing a waveform dataset comprising the at least one first data section, the at least one second data section and the at least on third data section.

2. The method of claim 1, wherein the waveform descriptive parameters of the at least one first data section include digital in-phase data and digital quadrature data.

3. The method of claim 1, wherein the waveform descriptive parameters of the at least one first data section include a parameter set for configuring the target device.

4. The method of claim 1, wherein the target device information in the at least one second data section comprises at least one of:
a serial number of the target device;
a device identifier.

5. The method of claim 1, wherein the time information in the at least one third data section comprises at least one of:
a period of validity;
a time of expiration.

6. The method of claim 1, comprising a step of encrypting the waveform dataset at least in part.

7. The method of claim 6, further comprising a step of including a decryption functionality into the waveform dataset, wherein the decryption functionality can be activated based on predetermined authentication credentials.

8. The method of claim 1, wherein the waveform comprises at least one of:
a metadata section including at least one of:
information of a creator of the waveform;
information of a user of the waveform dataset;
information of a use case/application applicable for the waveform;
information of a use case/application applicable for the date;
information of a use case/application applicable for the time information,
information of a use case/application applicable for the creation date;
information of a use case/application applicable for an expiration date.

9. The method of claim. 1, comprising a step of including a digital signature in the waveform dataset.

10. The system for providing a waveform dataset for executing waveform generation on a signal generation device, the system comprising:
a data generator, configured to generate at least one first data section comprising waveform descriptive parameters, generate at least one second data section comprising target device information relating to a number of one or more target devices for executing the waveform generation, generate at least one third data section comprising time information relating to an execution period of the waveform dataset, and to compile a waveform dataset including the at least one first data section, the at least one second data section and the at least on third data section;
a waveform memory, configured to store the waveform dataset; and
a transmission device, configured to provide the waveform dataset to the signal generation device.

11. The system of claim 10, further comprising a user interface for receiving specifications of a desired signal waveform, wherein the data generator is configured to generate at least the descriptive parameters based on the received specifications.

12. A signal generation device for generating a signal having a predetermined waveform, the signal generation device comprising:
a receiving unit configured to receive a waveform dataset including at least one first data section comprising waveform descriptive parameters, at least one second data section comprising target device information relating to a number of one or more target devices for executing the waveform generation and at least one third data section comprising time information relating to an execution period of the waveform dataset; and
a signal processor configured to generate an output signal based on the waveform descriptive parameters of the received waveform dataset, if the time information in the respective dataset meets a predetermined condition.

13. The device of claim 12, wherein the receiving unit is configured to receive a waveform dataset which is encrypted at least in part, and wherein the signal generation device comprises a decryption unit configured to decrypt the encrypted waveform dataset.

14. The device of claim 13, comprising a memory configured to store the received waveform dataset in an at least partly encrypted form, wherein the decryption unit is configured to decrypt the encrypted waveform dataset, if the related time information is valid.

15. The device of claim 12, comprising an authentication unit, configured to receive authentication information of a user or a group of users, wherein the signal processor is configured to generate the output signal, if a predetermined user or a user of a predetermined group has been authenticated based on the received authentication information.

\* \* \* \* \*